US009770682B2

(12) United States Patent
Massey

(10) Patent No.: US 9,770,682 B2
(45) Date of Patent: Sep. 26, 2017

(54) FRESH AIR INTAKE SYSTEM FOR OVERBURDEN DRILLS

(76) Inventor: Blake Allan Massey, Jasper, AL (US)

( * ) Notice: Subject to any disclaimer, the term of this patent is extended or adjusted under 35 U.S.C. 154(b) by 996 days.

(21) Appl. No.: 12/802,852

(22) Filed: Jun. 16, 2010

(65) Prior Publication Data

US 2010/0330897 A1    Dec. 30, 2010

Related U.S. Application Data

(60) Provisional application No. 61/269,348, filed on Jun. 24, 2009.

(51) Int. Cl.
*F24F 7/007* (2006.01)
*B01D 46/00* (2006.01)
*B60H 1/30* (2006.01)

(52) U.S. Cl.
CPC ............... *B01D 46/00* (2013.01); *B60H 1/30* (2013.01); *B01D 2273/28* (2013.01); *B01D 2279/60* (2013.01)

(58) Field of Classification Search
CPC  B01D 46/00; B01D 2273/28; B01D 2279/60; B60H 1/30
USPC .......... 454/69, 143, 156, 157, 275, 338, 370
See application file for complete search history.

(56) References Cited

U.S. PATENT DOCUMENTS

| | | | | |
|---|---|---|---|---|
| 2,356,392 A | * | 8/1944 | Fluor | 114/211 |
| 2,429,732 A | * | 10/1947 | Roos | 123/1 R |
| 3,464,506 A | * | 9/1969 | Petrell et al. | 175/14 |
| 3,734,211 A | * | 5/1973 | Haisch et al. | 175/85 |
| 3,844,202 A | * | 10/1974 | Ferguson | 454/143 |
| 3,892,079 A | * | 7/1975 | Hirano et al. | 37/309 |

\* cited by examiner

*Primary Examiner* — Alissa Tomkins
*Assistant Examiner* — Dana Tighe

(57) ABSTRACT

A fresh air intake system for overburden drills with an air intake assembly mounted along the drill mast to access air at the greatest practical height above ground, an air filter assembly, and a pressure blower/circulating fan assembly to supply the cleanest air practicable into the operator's cab under positive pressure. The height of the drill mast is utilized to access cleaner air at greater heights, with the air inlet located strategically toward the top of the mast. The intake assembly includes a rain cap, an intake tube mounted along the drill mast, and a flexible section at the drill mast pivot point to accommodate raising and lowering of the mast without interference or obstruction. The air filter assembly is mounted in series with the pressure blower/circulating fan assembly, which operates with negative inlet pressure and supplies filtered air under positive pressure into the enclosed cab.

2 Claims, 2 Drawing Sheets

FRESH AIR INTAKE SYSTEM FOR OVERBURDEN DRILLS

REFERENCE

I claim the benefits of Provisional Application No. 61/269,348 filed on Jun. 24, 2009.

BACKGROUND OF THE INVENTION

Continuously maintaining acceptable levels of respirable dust and airborne crystalline silica to which personnel are exposed during overburden and rock drilling operations at surface mining and construction sites can be an ongoing challenge. "Breathing excessive amounts of crystalline silica during rock drilling, can cause a serious fatal respiratory disease called "silicosis", according to the National Institute for Occupational Safety and Health (NIOSH)."

Numerous control and management techniques have been researched, developed, and implemented over the years to minimize the levels of respirable dust and crystalline silica to which drill operators are exposed. One area of focus is managing air quality inside enclosed operator cabs of overburden drills by supplying the cleanest air available into the cab and then maintaining positive pressure of filtered air inside the cab. This may be problematic in overburden and rock drilling operations considering that elevated levels of contaminates may exist in the outside air to be introduced into the drill cab through the air handling system.

Research and observations have concluded that the level of airborne contaminants associated with surface mining and construction (earth moving) is quite often related to the height above the ground, with the cleanest air most frequently found at greater heights. Air filtering systems for enclosed cabs on mobile equipment used in these operations, including overburden drills, are often located on top of the operator's cab to take advantage of height. Overburden drills, by the nature of their design and operation offer potential to access even cleaner air found at significantly greater heights by utilizing the height of the mast for the inlet to the air system. However, effectively locating the air inlet point high up on the drill mast requires a design that overcomes the constraints imposed with raising and lowering the drill mast and therefore avoids any obstruction or interference with the drilling operations.

This particular invention, the Fresh Air Intake System for Overburden Drills, is designed to access cleaner air at greater heights by locating the air intake point toward the top of the drill mast resulting in a much greater height above the ground. The system also includes air filter and pressure blower/circulating fan assemblies, whereby filtered intake air is supplied into the enclosed operator's cab under positive pressure.

BRIEF SUMMARY OF THE INVENTION

The Fresh Air Intake System for Overburden Drills consists of an elevated air intake point mounted toward the top of the drill mast, an air filter system, and pressure blower/circulating fan assembly. The system design overcomes the problems associated with utilizing the drill mast to reach this cleaner air source at a greater height above the ground. Air intake piping is mounted directly along the drill mast in a location that avoids mechanical interference with drilling operations while also providing a secure, durable installation. A length of flexible intake hose is strategically incorporated in the system at the mast pivot point to overcome the problems that would otherwise be associated with the raising and lowering of the drill mast.

In addition to accessing cleaner air expected at the increased height of the air intake point, this system includes air filter and pressure blower/circulating fan assemblies. The system design considers and addresses the harsh operating environment typically associated with overburden drilling. A variety of air filters and pressure blower/circulating fans can be used with the system to best address the particulars of individual applications to maintain high levels of performance, maximize reliability, reduce service intervals and parts inventories, and minimize maintenance costs, thereby increasing drilling efficiencies concurrently with providing operators with an improved operating environment.

For a typical application that requires higher air flow rates and system capacity, the preferred intake air filtering system might be a dual filter (inner and outer) canister-type unit similar to that often found on large diesel engines used on overburden drills or other mobile equipment at the site. This could be matched with a pressure blower/circulating fan that is heavy-duty, but light-weight, has a large diameter drive shaft and bearing assembly, and is operated at a reduced speed for longer life. The pressure blower/circulating fan in this case could be driven and controlled off the drill's existing hydraulic system with a relatively small motor designed for similar applications in the mining and construction industry environment. And finally, this intake system could be installed to operate in conjunction with air conditioning and heating units.

BRIEF DESCRIPTION OF THE SEVERAL VIEWS OF THE DRAWING

Two drawings accompany this specification of the Fresh Air Intake System for Overburden Drills.

DETAILED DESCRIPTION OF THE INVENTION

The Fresh Air Intake System for Overburden Drills locates the air intake point toward the top of the drill mast to access cleaner typically found at significantly greater heights above the ground surface, thereby overcoming one of the limitations of cab-mounted designs. This system also includes components designed to filter and continuously supply this cleaner air into the operator's cab to minimize airborne contaminants and provide the cleanest operating environment practical.

Figure 1:
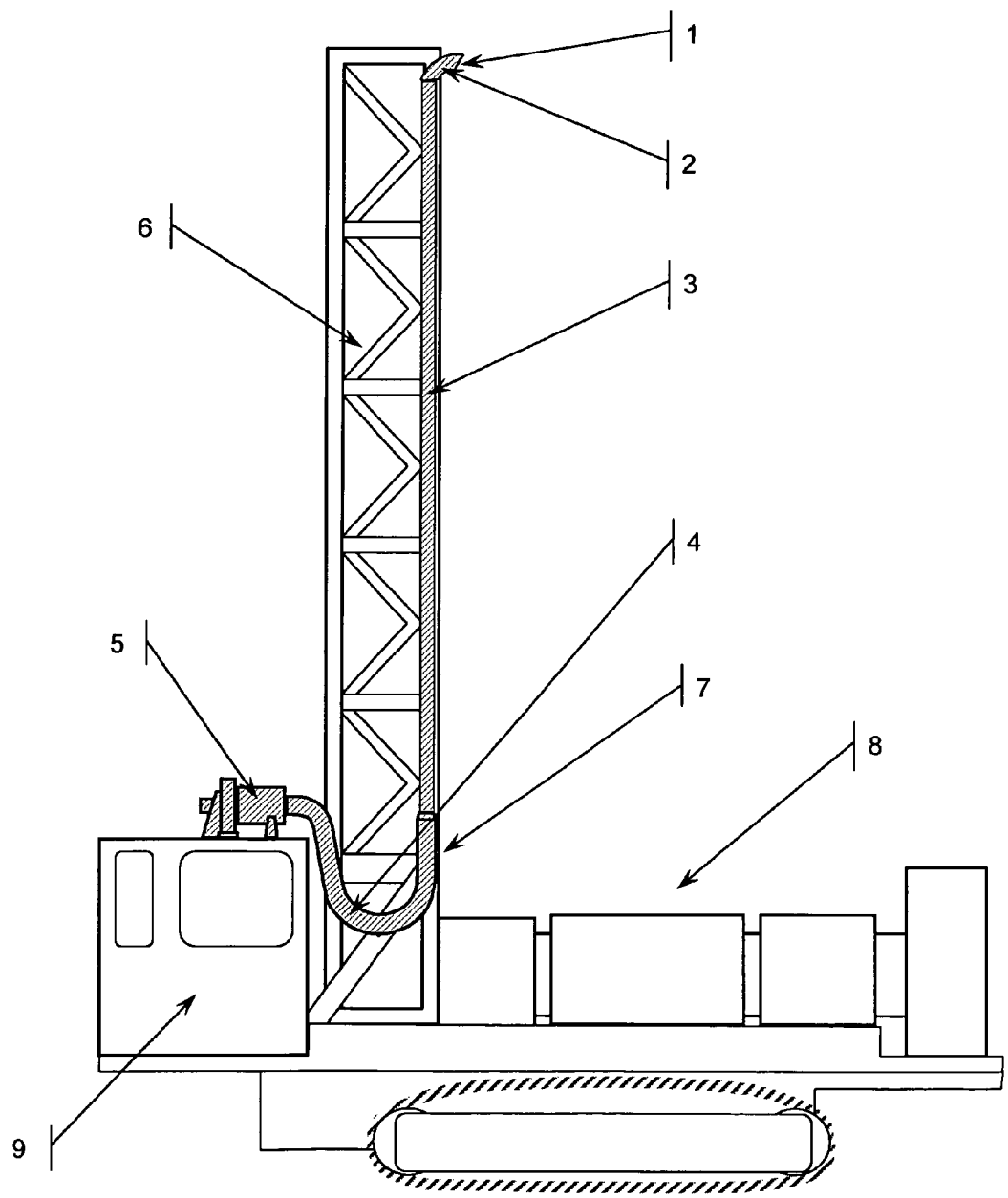
FIG. 1 is a side view of a typical track-mounted overburden drill equipped with the Fresh Air Intake System.

Referring to FIG. 1, an air intake tube 3 is installed along the drill mast 6 of an overburden drill 8, thereby raising the height of the air intake point 1 in order to access cleaner air expected at significantly greater heights above the ground. The top of the intake tube 3 is equipped with a rain cap 2 designed to minimize water entry with the drill mast 6 in both the raised and the lowered positions. Clean air is drawn into the system through the rain cap 2 at the top of the intake tube 3. The intake tube 3 can be constructed of various materials, ranging from heavy plastic to stainless steel depending on preference and typically would have a diameter ranging from approximately 4 inches to six inches. The lower end of this intake tube 3 is then joined to a section of reinforced, flexible air intake tube 4 at the mast pivot point 7. This allows the raising and lowering of the mast 6 without interference and maintains the integrity of the intake system. The lowermost portion of the section of reinforced, flexible air intake tube 4 is equipped with a drain point to eliminate the accumulation of water that might occur through condensation or other means over time.

Figure 2:
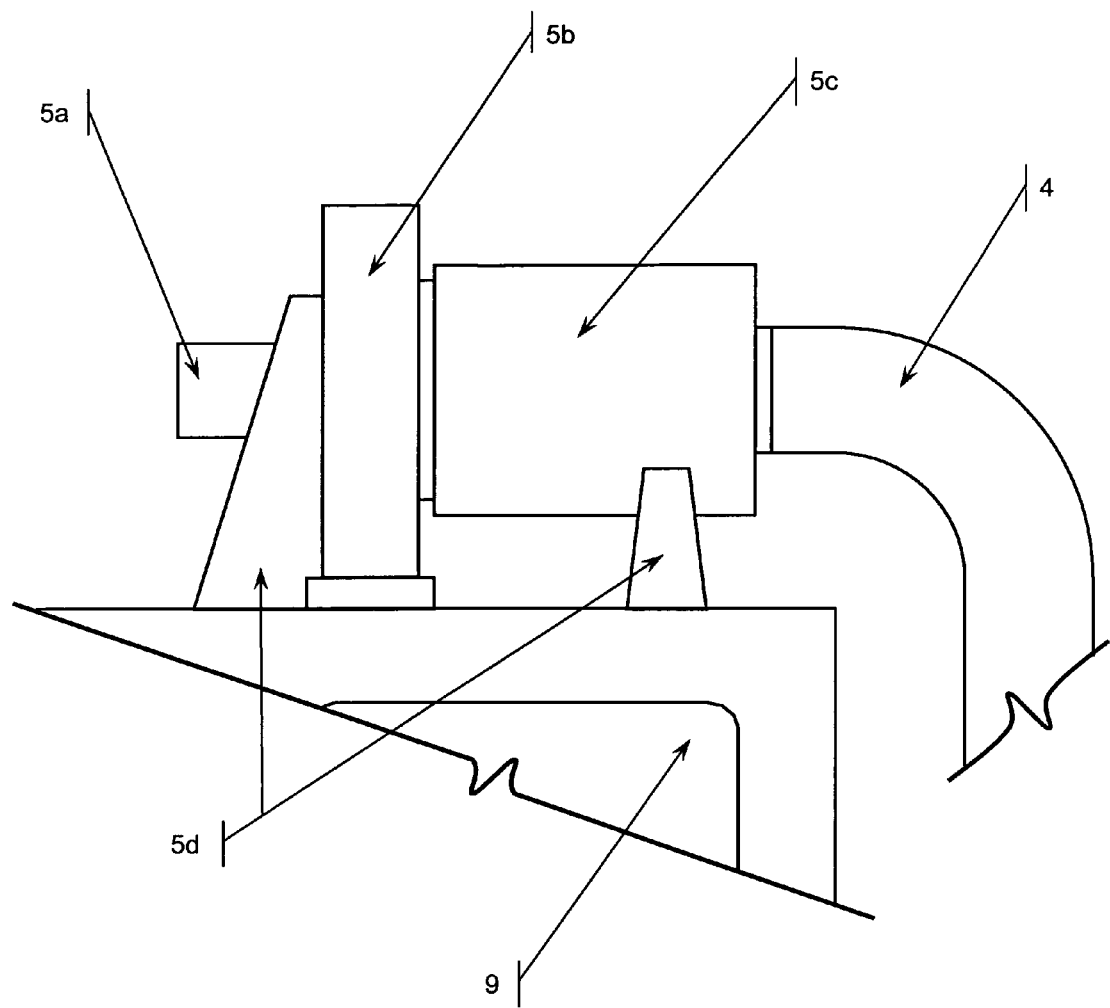
FIG. 2 provides an expanded side view of the filter and pressure blower/circulating fan assemblies of the Fresh Air Intake System.

The section of reinforced, flexible air intake tube 4 (FIGS. 1 and 2) is then connected to an air filter assembly 5c (FIG. 2) which may be mounted on top of the enclosed operator's cab 9 (FIGS. 1 and 2). The design of the filter assembly may vary depending upon the specific application, for function as well as ease of maintenance and service. One option might be a cylindrical, canister-type filter unit consisting of both an inner and outer air filter element such as might be used with the drill primary drive engine or with other diesel equipment operating at the site.

Referring to FIG. 2, the air filter assembly 5c is then connected in series to the air pressure blower/circulating fan 5b, which also may be mounted on top of the enclosed operator's cab 9. This air pressure blower/circulating fan 5b is designed to operate with a negative supply side pressure and supply air under positive pressure into the enclosed operator's cab 9. The particular pressure blower/circulating fan selected should be sized according to cab volume, typically with the capacity to exchange the cab volume several times in less than one minute while maintaining positive pressure on the order of 1" to 2" sp. Various options for the pressure blower/circulating fan are available, with preference given to light-weight housing construction but with heavy-duty bearing assemblies for long life and reliability. One such option might be an American Fan Company AF-10 or AF-12 series fan in Arrangement 2 with a radial wheel operating at a reduced maximum speed of approximately 2250 rpm.

Continuing with FIG. 2, the pressure blower/circulating fan 5b is driven with a drive motor 5a, preferably hydraulic. With power requirements typically on the order of one to two brake horsepower or less, most drill hydraulic systems can accommodate the increased load. Control of the system is through a variable speed controller located conveniently in the enclosed operator's cab 9. The air filter and air pressure blower/circulating fan assemblies 5 (FIG. 1) are mounted to the drill with intake assembly mounting brackets 5d (FIG. 2) designed for each particular installation.

The output of the fresh air intake system can be directly into the enclosed operator's cab or can be used as input to an industrial air conditioning unit. If the blower discharges directly into the operator's cab, it may be preferred to use an in-cab air conditioning unit to improve operator comfort during hot weather.

This system is designed to accommodate site specific modifications and the incorporation of other measures proven to minimize air-borne contaminants in the operator's working environment. For example, the system can be sized to allow outside venting of air from the bottom of the operator cab to minimize exposure to dust generated from the accumulation of dirt on the operator's boots, or even recirculated with the system intake air upstream of the filter assembly to further improve efficiencies and reduce the levels of dust generated by the drilling activities.

What is claimed is:

1. A fresh air intake assembly for supplying filtered air under positive pressure into an enclosed operator's cab of overburden drills, comprising:
    an air intake tube securely mounted alongside a drill mast of the overburden drill, comprising:
    an air intake point located toward a top of the drill mast to access cleaner air typically found at greater heights above a surrounding ground surface;
    wherein said air intake tube is equipped with a suitable rain cap;
    a section of flexible, reinforced air intake tube located at a drill mast pivot point to accommodate raising and lowering of the drill mast without interference or obstruction;
    wherein one end of said flexible, reinforced air intake tube is connected to a lower end of said air intake tube and one end to an air filter assembly; and
    a pressurizing blower and said air filter assembly to provide the filtered air under positive pressure into the enclosed operator's cab
    wherein said pressurizing blower and said air filter assembly are arranged in series with each other with respect to direction of air flow; and,
    wherein said pressurizing blower is designed to operate with negative inlet pressure and positive outlet pressure.

2. Said fresh air intake assembly of claim 1, wherein said air intake tube is securely mounted along the drill mast to extend the air intake point toward the top of the drill mast, said section of flexible, reinforced air intake tube located at the drill mast pivot point to accommodate raising and lowering of the drill mast without interference or obstruction.

* * * * *